United States Patent
Sim et al.

(10) Patent No.: US 8,263,428 B2
(45) Date of Patent: Sep. 11, 2012

(54) POLYMER ELECTROLYTES FOR DYE-SENSITIZED SOLAR CELLS AND METHOD FOR MANUFACTURING MODULES OF DYE-SENSITIZED SOLAR CELLS USING THE SAME

(75) Inventors: Chang-Hoon Sim, Seoul (KR); Sang-Pil Kim, Gyeongsangbuk-do (KR); Ki-Jeong Moon, Seoul (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 0 days.

(21) Appl. No.: 13/254,241

(22) PCT Filed: Mar. 22, 2010

(86) PCT No.: PCT/KR2010/001751
§ 371 (c)(1),
(2), (4) Date: Sep. 1, 2011

(87) PCT Pub. No.: WO2011/115319
PCT Pub. Date: Sep. 22, 2011

(65) Prior Publication Data
US 2012/0009715 A1    Jan. 12, 2012

(30) Foreign Application Priority Data
Mar. 19, 2010 (KR) .................. 10-2010-0024570

(51) Int. Cl.
*H01L 21/00* (2006.01)
(52) U.S. Cl. ..... 438/57; 136/263; 257/21; 257/E25.007; 257/E31.11; 359/270; 429/111; 429/303; 429/306; 438/61; 438/85

(58) Field of Classification Search .......... 136/263; 257/21, E25.007, E31.11; 359/270; 429/111, 429/303, 306; 438/57, 61, 85
See application file for complete search history.

(56) References Cited

U.S. PATENT DOCUMENTS

| | | | |
|---|---|---|---|
| 6,376,765 B1 | 4/2002 | Wariishi et al. | 136/263 |
| 2003/0127130 A1 | 7/2003 | Murai et al. | 136/263 |
| 2008/0111112 A1* | 5/2008 | Tahara et al. | 252/511 |
| 2008/0131771 A1* | 6/2008 | Wu et al. | 429/188 |
| 2009/0114283 A1 | 5/2009 | Lee et al. | 136/260 |
| 2010/0326500 A1* | 12/2010 | Watanabe et al. | 136/252 |

FOREIGN PATENT DOCUMENTS

| | | |
|---|---|---|
| JP | 2001-256828 | 9/2001 |
| KR | 10-2003-65957 | 8/2003 |

OTHER PUBLICATIONS

Chen, et al. (1999) "Kinetics study of imidazole-cured epoxy-phenol resins." *Journal of Polymer Science: Part A: Polymer Chemistry*, 37:3233-3242.
International Search Report and Written Opinion in PCT/KR2010/001751 dated Apr. 22, 2011, with attached English translation.

* cited by examiner

*Primary Examiner* — Asok Kumar Sarkar
(74) *Attorney, Agent, or Firm* — Harness, Dickey & Pierce, P.L.C.; Anthony G. Fussner; Kisuk Lee

(57) ABSTRACT

This disclosure provides polymer electrolytes for dye-sensitized solar cells that can not only prevent electrolytes from leaking, but also exhibit a higher solar conversion efficiency when compared with conventional polymer electrolytes, whereby the polymer electrolytes are applicable to a process for manufacturing dye-sensitized solar cells with a large surface area or flexible dye-sensitized solar cells, and methods for manufacturing modules of dye-sensitized solar cells using the same.

13 Claims, No Drawings

POLYMER ELECTROLYTES FOR DYE-SENSITIZED SOLAR CELLS AND METHOD FOR MANUFACTURING MODULES OF DYE-SENSITIZED SOLAR CELLS USING THE SAME

CROSS-REFERENCE TO RELATED APPLICATIONS

This application is a national phase application of PCT Application No. PCT/KR2010/001751 filed on Mar. 22, 2010, which claims the benefit and priority to Korean Patent Application No. 10-2010-0024570 filed Mar. 19, 2010. The entire disclosures of the applications identified in this paragraph are incorporated herein by references.

FIELD

This disclosure generally relates to polymer electrolytes for dye-sensitized solar cells and methods for manufacturing modules of dye-sensitized solar cells using the same, and more specifically to polymer electrolytes for dye-sensitized solar cells that can not only prevent electrolyte from leaking which is one of the worst drawbacks in conventional dye-sensitized solar cells using liquid electrolytes, but also exhibit a higher solar conversion efficiency compared with conventional polymer electrolytes and be applicable to a process for manufacturing dye-sensitized solar cells with a large surface area or flexible dye-sensitized solar cells, and methods for manufacturing modules of dye-sensitized solar cells using the same.

BACKGROUND

Recently, the photovoltaic cell or solar cell market is rapidly growing thanks to worldwide investments in the alternative energy industry and green growth policy, and production of solar cell modules is expected to grow at an annual rate of 50% or higher. In particular, according to NanoMarkets (a photovoltaic industry analyst, in Glen Allen, Va.), solar cell modules are predicted to produce up to 34.7 Gigawatts (GW) by 2015 up from 6 GW in 2008.

However, because of structural problems in solar cells using crystalline silicon which lead to a high price of solar cell modules since their manufacturing process is very complicated and the productivity is very low because of batch production, thin film solar cells using amorphous silicon or other products formed by depositing silicon using stainless-steel or polyimide, which is very flexible and is thin and light, as a substrate have been developed lately. However, though this kind of products has an advantage of being relatively light in weight and of reducing the production cost thereof, the solar cells of this type have an efficiency of about 6% which is much lower than that of the crystalline silicon solar cells which is about 7 to 20% and have a drawback of a shorter service life.

Because of the problems described above, though attempts have been made to develop solar cells harnessing photovoltaic effect of organic materials instead of using silicon, the solar cells using such organic materials have a disadvantage of a low energy conversion efficiency and most of all have an issue in durability. Michael Grätzel who is a professor at the École Polytechnique Fédérale de Lausanne in Switzerland proposed a new type of solar cell, so called a dye-sensitized solar cell consisting of photosensitive dye particles and titanium dioxide of nanoparticles, and reported a result of a very high energy conversion efficiency of around 10% comparable to solar cells based on amorphous silicon series among conventional inorganic solar cells. It has been known that the above dye-sensitized solar cell has a very high possibility of commercialization because its production cost is just around 20% of that of silicon solar cells, and accordingly there have been a lot of research studies around the world for real applications.

Most importantly, low economic feasibility has been an issue because of a high production cost of silicon solar cells and a limitation of efficiency of a cell itself over the course of development of the solar cells described above. In addition, there is an urgent need for development of solar cell modules with easy accessibility as an alternative energy in daily lives. While the industry has practically focused mainly on the development in the field of installing silicon-based solar cells so far, future development of solar cells is expected to pioneer new applications suitable for respective properties of dye-sensitized solar cells, organic solar cells, and thin film solar cells, and there is an increased need for a new technology at the same time. In particular, whereas silicon solar cells can generate electric power only with a very large amount of light, since dye-sensitized solar cells can produce electric power even with a small amount of direct rays of the sun, the dye-sensitized solar cells can generate electric power more efficiently than the silicon solar cells as a building integrated photovoltaic system for generating electric power using building walls, windows and so on. Therefore, though silicon solar cells may further be developed as a large-scale power plant in the future, large portions of photovoltaic generation using buildings in daily lives are expected to be covered by dye-sensitized solar cells. Besides, since applicability of such solar cells is anticipated to expand to various electronics or small portable gadgets using indoor lightings, automobiles, and even to clothes because of environment-friendliness, transparency and coloring, and efficiency under a low amount of light, a lot of research studies in the industry are being carried out for commercial availability.

Such a dye-sensitized solar cell was first invented by professor Michael Grätzel of Switzerland based on the principle of photosynthesis of plants, and consists of a working electrode, a layer of inorganic oxide such as titanium dioxide having dye molecules adhered thereto, a liquid electrolyte, and a counter electrode. Photo-electric conversion occurs through photo-electric chemical reaction between electrodes, a brief explanation of such process is as follows.

First, a working electrode is composed of an oxide semiconductor of nanosize having a molecular dye adhered thereto that absorbs sunlight to emit electrons. When external light reaches the molecular dye, electrons in the dye are excited to an elevated level of energy and then are received by the oxide semiconductor to transfer outside. The electrons with an elevated level of energy consume their energy while flowing through the external circuit, and then arrive at a counter electrode. The dye in the working electrode which emitted electrons receives electrons back through the electrolyte, and such an oxidation-reduction process occurs continuously in the course of supplying energy through ion transfer within the electrolyte.

Therefore, electrolytes play a very important role to transfer electrons through ionization, and especially the contact area between the electrodes and the electrolyte determines the amount of electric power produced. In other words, since the wider the contact area is, the faster and the more reactions can occur and the more the amount of the dye can be adhered, nanoparticles are used as materials of the respective electrodes. If nanoparticles are used, the surface area of the material significantly increases for the same volume and accordingly the material can have a larger amount of dye adhered to the surface thereof, thereby increasing the speed of electrochemical reactions between the electrode and the electrolyte. In general, a semiconductor oxide electrode of titanium dioxide for forming the working electrode is coated with a thickness of 10~20 µm of nanoparticles having a size in the order of 20~50 nm, and the dye adheres to the surface thereof. In addition, the counter electrode is coated with a thin layer of platinum particles having a size less than 10 nm on the substrate thereof.

On the one hand, dye-sensitized solar cells using conventional liquid electrolytes have inherent problems in stability and durability such as degradation of properties because of leakage of the electrolyte and evaporation of solvent, thereby hindering it from commercialization. In particular, it is impossible to manufacture such dye-sensitized solar cells into ones with large area because of a process of injecting electrolytes, which in turn makes it hard to achieve a low production cost which is one of the main benefits of the dye-sensitized solar cells. In view of such fact, there is an urgent need for development of solid or semi-solid electrolytes to replace liquid electrolytes.

For the reasons described above, the industry has made efforts to replace liquid electrolytes with solid or semi-solid electrolytes. There has been research and development using organic polymers or inorganic hole transfer materials (HTM) for such solid or semi-solid electrolytes, and the main research target has been organic polymer electrolytes because of its advantages in commercialization. This is because such organic polymer electrolytes make it possible to transform the shape thereof during the manufacturing of solid dye-sensitized solar cells so as to provide flexibility, and to manufacture thin films using techniques such as spin coating, which also serves as one of the advantages. In addition, they can maintain stable performance under thermal stress or light soaking compared with the liquid electrolytes, and can contribute to improvement in long-term stability and provide an advantage of low production cost. Examples of commonly used polymers include PEO, poly(propylene oxide) (PPO), poly(ethylene imine) (PEI), poly(ethylene sulphide) (PES), poly(vinyl acetate) (PVAc), poly(ethylene succinate) (PESc) and so on, and there have been research studies on the polymers described above because it is known that ion movements within the polymer electrolytes occur in the amorphous region by means of segmentation movements of polymer chains. Among the above, a complex of poly(ethylene oxide) (PEO) and alkali metal salts is the most widely known polymer electrolyte.

A polymer electrolyte was first proposed by preparing a complex of poly(ethylene oxide) and alkali metal salts by Wright group in 1975, and thereafter started being applied to lithium batteries of polymer electrolytes and to electrochemistry by Armand et al. in 1978. The majority of the conventional polymer electrolytes that have been reported so far are based on PEO, and PEO has been the most reported as a representative material for polymer electrolytes in the field of fuel-cells ever since the electrical conductivity according to mixing with metal salts was disclosed. Based on such reports, PEO has become one of the research topics getting the most attention among polymer electrolytes for dye-sensitized solar cells. This is because PEO is applicable to solid dye-sensitized solar cells since it exhibits various properties depending on its molecular weight, has excellent chemical stability, and shows a higher mechanical strength compared with liquid electrolytes. In particular, it is known that PEO has a regular arrangement of a large amount of oxygen atoms and an ion transfer mechanism for transferring metal cations by way of a spiral structure formed by polymer chains. Besides, polymer electrolytes are preferably composed of metal salts with low lattice energy, for example alkali metals such as LiI, KI, NaI and the like and polymers having polar groups capable of dissociating the metal salts. Thus, the polymers need to contain lone pair electrons capable of giving electrons, such as ones from oxygen (O) or nitrogen (N), and the polar groups make a coordinate bond with metal cations, forming a complex of polymer-metal salts.

However, since PEO basically exhibits high crystallinity for a high molecular weight, it has an essential limitation of a high molecular weight in consideration of durability. Such crystallinity of PEO (about 80%) serves as a disadvantage for having low ionic conductivity (10-8 to 10-5 Scm-1) and diffusion coefficient at room temperature. In addition, depending upon the chain size of polymers, how much of the polymer electrolytes can infiltrate pores of the oxide layer of a nano-sized titanium dioxide is an important factor and it is difficult for PEO with a high molecular weight to infiltrate the oxide layer, which in turn not only reduces energy conversion efficiency and but also shows a limitation on manufacturing solar cells in practice. Therefore, though there have been research studies on various methods to lower crystallinity of electrolytes based on PEO, to increase ionic conductivity and diffusion coefficient, and to enhance energy conversion efficiency by improving interfacial contact, the results so far just remain insignificant.

A main reason for the above problems is that ionic conductivity is inherently slow in a solid phase. In order to overcome such a drawback, researches related to semi-solid or gel-type polymer electrolytes utilizing intermediate characteristics between liquid and solid have also been actively carried out. Korean Patent Application Publication No. 2003-65957 describes semi-solid polymer electrolytes by way of example, and asserts that the semi-solid polymer electrolytes exhibit a high ionic conductivity similar to that of liquid electrolytes at room temperature. However, the semi-solid polymer electrolytes have lower durability when compared with solid polymer electrolytes because they exhibit poor mechanical properties such as glass transition temperature (Tg). The process for manufacturing solar cells is difficult because of semi-solid characteristics, and it is hardly possible to completely prevent electrolyte from leaking because solvents are mixed therewith.

As described above, most of the polymer electrolytes are based on poly(ethylene oxide) PEO, and accordingly it is important to increase the amorphous region by lowering the crystallinity thereof. To this end, improvement of ionic conductivity, and decrease of crystallinity through addition of nanoparticles, crosslinking, blend, formation of copolymers or the like are the main research topics in polymer electrolytes, and it is possible to obtain an additional performance improvement by adjusting the molecular weight or terminal groups of polymers.

For example, the first dye-sensitized solar cell using a polymer electrolyte without a solvent was reported by a research group with professor De Paoli of Brazil in 2001, and a polymer electrolyte composed of poly(epichlorohydrin-co-ethylene oxide)/NaI/$I_2$ was prepared to show an efficiency of 1.6% at 100 mW/cm$^2$. Then, a group of researchers called Flaras from Greece mixed a PEO electrolyte of high crystallinity with nanoparticles of titanium oxide and presented a result of PEO with reduced crystallinity in 2002, and the group of Professor Flavia Nogueira prepared titanium oxide into a form of a nano tube using the same poly(epichlorohydrin-co-ethylene oxide) as the group of Professor De Paoli to lower crystallinity thereof and reported the result showing a solar conversion efficiency of up to 3.5%.

However, conventional research studies as described above have little significance in the results of research itself and there has not been any development for commercially available products. Thus, in order to achieve early commercialization of dye-sensitized solar cells by improving performance and durability thereof, there is an urgent need for development of novel polymer electrolytes.

To this end, the present inventors have achieved devising a novel polymer electrolyte and an assembly process thereof that overcomes the limitations of conventional polymer electrolytes based on PEO. Considering the prior art of the industry that though development of new transparent electrodes, technology for new semiconductor materials and for manufacturing the same, technology of dye for absorbing a wide range of wavelength, development of new materials for a counter electrode and techniques for manufacturing the same, and the like have already reached a level of commercialization, there is still the same limitation of using liquid electrolytes, polymer electrolytes in accordance with the present disclosure will have great particular effects in the art to which the present disclosure pertains.

PRIOR ART DOCUMENTS

Patent Document

Patent Document 1: Korean Patent Application Publication No. 2003-65957

Non-Patent Literature Document

Non-patent Literature Document 1: Yi-Cheng Chen et al., Kinetics study of imidazole-cured epoxy-phenol resins, *Polymer Chemistry* Vol. 37, Issue 16, pp. 3233-3242.

SUMMARY

Technical Objective

The present disclosure provides polymer electrolytes for dye-sensitized solar cells that can not only prevent electrolytes from leaking which is one of the worst drawbacks in conventional dye-sensitized solar cells using liquid electrolytes, but also exhibit a higher solar conversion efficiency compared with conventional polymer electrolytes and be applicable to a process for manufacturing dye-sensitized solar cells with a large surface area or flexible dye-sensitized solar cells, and methods for manufacturing modules of dye-sensitized solar cells using the same.

These and other features and advantages of the present disclosure will become apparent in the following description of preferred embodiments.

Solution

The above object is achieved by a polymer electrolyte for a dye-sensitized solar cell comprising a heat-curable epoxy resin, an imidazole-based curing accelerator, and metal salts.

Here, the heat-curable epoxy resin has 2 to 8 functional groups, and a molecular weight of 500 to 8,000.

Preferably, the content of the imidazole-based curing accelerator is 0.1 to 20 parts by weight per 100 parts by weight of the heat-curable epoxy resin.

The content of the metal salts is preferably 1 to 200 parts by weight per 100 parts by weight of the heat-curable epoxy resin.

Preferably, the polymer electrolyte for a dye-sensitized solar cell has a viscosity of 10 to 8,000 cps (centipoises).

Moreover, the above object is further achieved by a method for manufacturing a module of dye-sensitized solar cells using a polymer electrolyte for a dye-sensitized solar cell, wherein the above polymer electrolyte for a dye-sensitized solar cell is used, and wherein the polymer electrolyte for a dye-sensitized solar cell is used as an adhesive product between a working electrode and a counter electrode and a final form of bonding is maintained in a solid phase.

Preferably, the bonding between the electrodes is a hot melt bonding.

More preferably, the bonding between the electrodes is a continuous roll coating or a continuous roll hot melt using a flexible substrate.

Effects

The polymer electrolytes for dye-sensitized solar cells and methods for manufacturing modules of dye-sensitized solar cells using the same in accordance with the present disclosure have an effect of not only preventing electrolyte from leaking which is one of the worst drawbacks in conventional dye-sensitized solar cells using liquid electrolytes, but also exhibiting a higher solar conversion efficiency compared with conventional polymer electrolytes and being applicable to a process for manufacturing dye-sensitized solar cells with a large surface area or flexible dye-sensitized solar cells.

DETAILED DESCRIPTION

Hereinafter, preferred embodiments of the disclosure will be described in detail with reference to the accompanying drawings. It should be understood that the detailed description of the preferred embodiments of the disclosure are given by way of illustration only, and accordingly various changes and modifications within the spirit and scope of the disclosure will become apparent to those skilled in the art.

The present disclosure relates to polymer electrolytes for constituting dye-sensitized solar cells, and the polymer electrolyte consists of a heat-curable epoxy resin and contains an imidazole-based curing accelerator and metal salts. As such, it is possible to provide excellent polymer electrolytes for dye-sensitized solar cells that can not only prevent electrolytes from leaking which is one of the worst drawbacks in conventional dye-sensitized solar cells using liquid electrolytes, but also be applicable to a process for manufacturing dye-sensitized solar cells with a large surface area or flexible dye-sensitized solar cells.

In order to devise a novel polymer electrolyte that can fundamentally solve the problem of electrolyte leakage existing in conventional liquid electrolytes and is applicable to a process for manufacturing solar cells with a large surface area or flexible solar cells, the present inventors have designed the following characteristic criteria of polymeric compositions:

1) a polymeric composition having a branch structure that is difficult to crystallize, 2) a polymeric composition having excellent interfacial adhesion and capable of easily infiltrating nanopores of the oxide layer of titanium dioxide, 3) a polymeric composition having excellent bonding strength between a working electrode and a counter electrode and having excellent durability, 4) a polymeric composition capable of dissociation of metal salts and ion transfer, and 5) an assembly process simultaneously capable of solution coating and film bonding of hot melt type.

In order to achieve the above criteria, the present inventors have devised use of heat-curable epoxy resins as a novel polymer electrolyte. In accordance with general knowledge that epoxy resins are used for insulation materials, epoxy resins have a limitation on being used as electrolytes; however, the present inventors have reached the following design bases of contrarian approach through exhaustive research on the characteristics of solid electrolytes required for dye-sensitized solar cells:

1) Epoxy resins form a three dimensional (3D) network crosslink structure capable of transferring metal cations, 2) Epoxy resins contain a large amount of polar groups capable of dissociating metal salts, 3) Epoxy resins have a low molecular weight at the beginning of curing, so that they can readily infiltrate the nano-sized oxide layer of titanium dioxide in the course of manufacturing solar cells, 4) Epoxy resins have a good adhesive strength and durability after curing, and 5) Epoxy resins can be manufactured into a liquid, semisolid, or pure solid type without solvents, so that solution coating as well as hot melt bonding of film type is possible in the course of manufacturing solar cells.

The polymer electrolyte for dye-sensitized solar cells in accordance with the present disclosure consists of a heat-curable epoxy resin as a matrix polymer, and contains an imidazole-based curing accelerator and metal salts as ion or charge transfer carrier. Since the heat-curable epoxy resin has a large amount of regular oxygen atoms on the main chain thereof, it can easily dissociate the metal salts so as to be used as an electrolyte, thereby making it possible to produce electrolytes from liquid type with a low molecular weight to solid type. As such, in case of applying to a process for manufacturing dye-sensitized solar cells, a process of solution coating or a module bonding of hot melt type is possible and it is possible to manufacture dye-sensitized solar cells having excellent module adhesiveness and durability by solidifying through heat-curing.

In addition, the polymer electrolyte for dye-sensitized solar cells in accordance with the present disclosure is prepared by mixing a heat-curable epoxy resin of liquid or solid phase with an imidazole-based curing accelerator, followed by adding metal salts as an ion transfer carrier in accordance with a required amount, using a method of common compounding technique. Especially, in case of using a heat-curable epoxy resin of solid phase, a polar solvent such as ethyl methyl keton is also used so as to prepare the heat-curable epoxy resin in liquid phase.

A method of mixing the polymer electrolyte for dye-sensitized solar cells in accordance with the present disclosure is not particularly limited, and examples of such methods may include a melt-mixing method using Banbury mixer, a single-screw extruder, two-screw extruder and the like, and a method of mixing solutions by stirring (solution blend). Among these, it is preferable to use the method of mixing solutions by stirring. Furthermore, it is desirable to appropriately use dispersion mixing and distribution mixing together in order to distribute metal salts within the epoxy resin in a balanced manner in the course of mixing solutions. To this end, it is preferable to dissolve the metal salts in a small amount of epoxy resin in advance to prepare master batch and then to inject it when mixing.

The epoxy resin used in the present disclosure can be of a form of liquid or solid in the beginning, and it can be prepared by mixing two or more kinds as necessary. For example, if no solvent is used in the course of forming a layer of electrolyte coating, a solution can be coated on a counter electrode formed with an oxide layer of titanium dioxide using liquid epoxy resin. In addition, if the epoxy resin is subject to a drying process by using a solvent, a layer of electrolyte coating in solid phase can be formed by first dissolving a solid epoxy resin in a solvent, followed by increasing drying temperature over the boiling point of the solvent in the course of coating on the counter electrode.

The polymer electrolyte for dye-sensitized solar cells according to the present disclosure has a viscosity capable of solution coating, preferably of 10 to 8,000 cps (centipoises), more preferably of 50 to 3,000 cps, and even more preferably of 100 cps to 500 cps. This is because if the viscosity is lower than 10 cps, it is difficult to secure space with the counter electrode when forming an electrolyte layer on the working electrode formed with an oxide semiconductor layer, and if higher than 8,000 cps, it is difficult for the electrolyte to infiltrate nano-sized pores of the oxide semiconductor layer. Solid dye-sensitized solar cells exhibit a lower energy conversion efficiency than liquid dye-sensitized solar cells, and this is mainly because of low conductivity in the solid electrolyte and incomplete contact between an electrolyte and an electrode. As such, a high electron recombination speed occurs between a photoelectrode and a solid electrolyte, thereby affecting the overall efficiency. In the case that a polymer electrolyte cannot smoothly infiltrate the nano-sized pores of a semiconductor oxide layer, the efficiency of transfer of electrons discharged from the dye decreases, which in turn directly lowers energy conversion efficiency and which exhibits a practical limitation of manufacturing solar cells. Accordingly, if an epoxy resin of a low molecular weight is used as a matrix polymer in forming an electrolyte as in the present disclosure, infiltration of the electrolyte into a semiconductor oxide layer improves and generation of electric current in the working electrode increases, thereby solving a problem of poor contact with electrodes existing in the solid electrolyte.

Moreover, since the epoxy resin has an inherent property of an adhesive, it can not only impart durability by providing adhesive strength in the course of bonding a working electrode and a counter electrode during the manufacture of solar cell modules, but also avoid an encapsulation process which is essential in the case of using conventional liquid electrolytes, thereby significantly improving productivity when manufacturing solar cells of large surface area.

Furthermore, the polymer electrolyte for dye-sensitized solar cells in accordance with the present disclosure can be prepared in various ways. For example, in case of producing solar cell modules of large surface area, it is possible to use a method in which the polymer electrolyte mixture is coated on a substrate formed with a semiconductor oxide layer using a known roll knife coater, a Gravure coater, a die coater, or a reverse coater, followed by drying it to form a polymer electrolyte layer, and a counter electrode is deposited on the polymer electrolyte layer by way of roll lamination, or a method in which the polymer electrolyte layer is separately coated on the counter electrode using a known technique, followed by drying, and is laminated on the working electrode, and the polymer electrolyte is caused to infiltrate the semiconductor oxide layer by applying heat. Alternatively, in case of manufacturing solar cells of small surface areas, it is also possible to simply preparing a polymer electrolyte solution, followed by coating it on respective electrodes by way of spin coating.

In the case of forming an electrolyte layer on a glass substrate of large surface area in the above process of manufacturing the solar cell modules, whereas it is necessary for conventional methods to subject to a process of injecting a liquid electrolyte and of sealing it for a long time, if the polymer electrolyte of the present disclosure is used, it is possible to use not only solution coating but also hot melt bonding, and if a flexible substrate such as a polymer film is used as a material for electrodes, continuous processes are possible, so as to enable mass production of dye-sensitized solar cells of large surface areas.

Furthermore, the epoxy resin used in the present disclosure is not particularly limited, as long as it can exhibit adhesive reaction after curing. An epoxy resin with 2 to 8 functional groups, and preferably a molecular weight of 500 to 8,000, and more preferably of 500 to 3,000 can be used. For example, it is possible to use 2-functional epoxy resins such as a bisphenol A epoxy resin or a bisphenol F epoxy resin, or novolac epoxy resins such as a phenol novolac epoxy resin or a cresol novolac epoxy resin. Moreover, it is also possible to use polyfunctional epoxy resins or heterocycle-containing epoxy resins.

In addition, the polymer electrolyte for dye-sensitized solar cells in accordance with the present disclosure comprises an imidazole-based curing accelerator to initiate the curing reaction of the heat-curable epoxy resin. The imidazole-based curing accelerator initiates the curing reaction of the heat-curable epoxy resin to develop an amorphous cure structure and simultaneously forms a cationic junction point after reaction with the epoxy resin, thereby promoting dissociation of metal salts and ion transfer, so as to enhance the efficiency of the dye-sensitized solar cell.

More specifically, the polymer electrolyte of the present disclosure comprises an imidazole-based curing accelerator to form a cure structure of a branch structure. The polymer electrolyte forms a branch structure through polyetherification of the nitrogen atoms attached to the side chains of the imidazole-based curing accelerator and the epoxy resin (Yi-Cheng Chen et al., Kinetics study of imidazole-cured epoxy-phenol resins, *Polymer Chemistry* Vol. 37, Issue 16, pg. 3233-3242). In this way, it is possible to obtain an amorphous cure structure of the epoxy resin through ionic polymerization, and the epoxy cure structure obtained as such includes a branching free volume therein, thereby enabling transfer of metal cations and anions.

The curing accelerator used in the polymer electrolyte for dye-sensitized solar cells in accordance with the present disclosure may be limited to imidazoles. Examples of such imidazoles may include 2-methylimidazole, 2-ethyl-4-methylimidazole, 2-benzyl-4-methylimidazole, 1-(2-cyanoethyl)-2-ethyl-4-methylimidazole, 1-cyanoethyl-2-methylimidazole, 1-(2-cyanoethyl)2-phenyl-4,5-di(cyanoethoxymethyl) imidazole and so on. It is possible to use one kind or two or more kinds of such imidazoles together. Some of the commercially available imidazoles include, for example, product names of 2,4EMIZ, 2B4MIZ, 2-EI, 2-PI, 2-PDHMI, 2E4MZ, 2PZ-CN, 2PZ-CNS produced by Shikocu Kasei Kogyo Co., Ltd. The content of the imidazole-based curing accelerator is preferably of 0.1 to 20 parts by weight per 100 parts by weight of the epoxy resin, and this is because if the content is less than 0.1 part by weight, it is difficult to form a branch structure because the epoxy resin cannot be cured smoothly, and if over 20 parts by weight, the epoxy resin undergoes curing too rapidly, thereby causing severe changes over time in preparing the electrolyte.

Though it is possible to use an amine curing agent having a primary or secondary amine group as the curing accelerator used in the polymer electrolyte for dye-sensitized solar cells of the present disclosure, in this case there is a disadvantage of forming a linear chain as the final cure structure, thereby increasing crystallinity thereof in the end. Accordingly, it is desirable to use imidazoles capable of ionic polymerization in the form of crosslink.

In addition, the polymer electrolyte is normally composed of a polymer having a polar group as the basic framework, and consists of metal salts of alkali series having low lattice energy for providing oxidation/reduction pair. Cations of the metal salts and polar groups such as oxygen or nitrogen of the polymer achieves a coordinate bond through Lewis acid-base interactions within the electrolyte, so as to create I- or I3-oxidation/reduction pairs. The created oxidation/reduction pairs either create or consume electrons through oxidation/reduction reaction. Furthermore, the electrons are delivered within the polymer electrolyte by ion movements, and it is known that the ion movements within the polymer electrolytes occur in the amorphous region by means of segmentation movements of the polymer chain. Thus, ionic conductivity depends directly on the mobility of polymer chains, and the concentration of a charge carrier also affects greatly. Mitate group proposed that in order to enhance the energy conversion efficiency of quasi-solid state DSSCs, a polymer network needs to contain a large amount of liquid electrolyte by forming a structure through chemical bond. Reactive molecules chemically bond each other through crosslinking within the polymer networks, to form 3-D network structures. In the present disclosure, an epoxy resin is used to form polymer networks in the form of a branch of solid phase, and to increase anion movements by I-, I3-oxidation/reduction pair with imidazole-based curing accelerator as a crosslink point.

Oxidation-reduction derivatives used in the solid polymer electrolyte of the present disclosure may comprise materials capable of providing oxidation/reduction pair, for example, halogenated metal salts such as LiI, NaI, KI, BrI, sodium bromide, and potassium bromide; and iodides of nitrogen-containing heterocyclic compounds such as imidazolium salts, pyrridinium salts, quaternary ammonium salts, pyrrolidinium salts, pyrazolidinium salts, isothiazolidinium salts, and isooxazolidinium salts. The organic solvents may comprise acetonitrile, 3-methoxypropionitrile, ethylene carbonate, propylene carbonate, dimethyl carbonate, diethyl carbonate, ethyl methyl carbonate, tetrahydrofuran, or gama-butyrolacton.

The content of the metal salts in the polymer electrolyte for dye-sensitized solar cells in accordance with the present disclosure is preferably 1 to 200 parts by weight per 100 parts by weight of the heat-curable epoxy resin, and this is because if the content of the metal salts is less than 1 part by weight, it is hardly possible to achieve ionic conductivity, and if over 200 parts by weight, it is impossible to prepare the electrolyte because of excessive coagulation of the metal salts.

In addition, a method for manufacturing a module of dye-sensitized solar cells using a polymer electrolyte for a dye-sensitized solar cell is a method for manufacturing solar cells using the polymer electrolyte for a dye-sensitized solar cell described above, wherein the polymer electrolyte for a dye-sensitized solar cell is used as an adhesive product between a working electrode and a counter electrode and a final form of bonding is maintained in a solid phase.

The bonding between the electrodes is a hot melt bonding, or the bonding between the electrodes is a continuous roll coating or a continuous roll hot melt using a flexible substrate.

Hereinafter, the present disclosure will be described in detail by way of preferred embodiments and comparative examples. However, the present disclosure is not limited to such embodiments.

Embodiment 1

(1) Production of a Working Electrode

After preparing an FTO glass substrate, a coating composition containing titanium oxide ($TiO_2$) was coated on top of the transparent conductive oxide layer of the substrate by the doctor blade method, followed by heat treatment for 40 minutes at 520° C., so as to achieve contact and filling between nano-sized metal oxide, thereby producing a nano oxide layer of a thickness of about 7 μm. The thickness was adjusted using 3M Scotch Magic Tape as a spacer. Thereafter, the same coating composition was applied on top of the nano oxide layer by the same method, followed by heat treatment for 40 minutes at 520° C., so as to produce a nano oxide layer of a thickness of about 15 μm. Then, a dye solution was prepared using N-719 dye by Solaronix and ethanol, in which the substrate formed with the nano oxide layer thereon was immersed for 48 hours, and then the substrate was dried to cause the nano-sized metal oxide to absorb the dye, thereby producing a negative electrode.

(2) Production of a Counter Electrode

After preparing an FTO glass substrate, a 2-propanol solution in which $H_2PtCl_6$ had been dissolved was coated on top of the transparent conductive oxide layer of the substrate by the spin coating method, followed by heat treatment for 30 minutes at 480° C., so as to form a platinum layer, thereby producing a positive electrode.

(3) Preparation of a Polymer Electrolyte

Specimen-1
After adding 100 parts by weight of cresol novolac epoxy resin (YDCN 8P by Toto Kasei Co.) and 2 parts by weight of 1-cyanoethyl-2-phenyl imidazole (Curezol 2PZ-CN by Shikocu Kasei Kogyo Co., Ltd.), they were stirred in the solvent of methylethylketone for 3 hours, and 5 parts by weight of LiI (by Sigma-Aldrich) were mixed and stirred for 12 hours to obtain a mixed solution of a polymer electrolyte.
Specimen-2
The same method as Specimen-1 was used except using 10 parts by weight of LiI.
Specimen-3
The same method as Specimen-1 was used except using 30 parts by weight of LiI.
Specimen-4
The same method as Specimen-1 was used except using 50 parts by weight of LiI.

(4) Production of a Dye-Sensitized Solar Cell Module

After applying the polymer electrolyte solution prepared as above on the working electrode produced as above by the mayer bar coating, followed by drying for 5 minutes at 80° C., and the solvent was removed to obtain a polymer electrolyte layer of a thickness of about 50 μm. Thereafter, the counter electrode was deposited and compressed by a hot press under the condition of 130° C. and 0.01 Mpa to produce a dye-sensitized solar cell without a separate encapsulation process.

Embodiment 2

The same method as Embodiment 1 was used except using 100 parts by weight of a liquid epoxy resin of bisphenol A type (YD128 by Toto Kasei Co.) instead of cresol novolac epoxy resin in preparing a polymer electrolyte.

Comparative Example 1

The same method as Embodiment 1 was used except that: 100 parts by weight of polyethylene oxide (PEO by Sigma-Aldrich) were used instead of cresol novolac epoxy resin in preparing a polymer electrolyte; a curing accelerator was excluded; acetonitrile (by Sigma-Aldrich) was used as a solvent, and a solution was divided in a dilution ratio of 5 parts by weight to 30 parts by weight in solid content, so that 5 parts by weight were first applied, followed by standby for 2 hours, and then 30 parts by weight were applied to complete the production of an electrolyte layer.

Test Example 1

In order to evaluate the ionic conductivity of the polymer electrolytes prepared by the above embodiments and comparative examples, an impedance analyzer was used and the values of ionic conductivity were determined using the following Mathematical Formula 1:

$$R = r \times (l/A) \quad \text{Mathematical Formula 1}$$

where "R" is resistance, "r" is ionic conductivity, "l" is the distance between electrodes, and "A" is the measured sectional area of a specimen.

Test Example 2

In order to evaluate the solar conversion efficiency of the dye-sensitized solar cells produced by the above embodiments and comparative examples, photovoltage and photocurrent were measured in the following way to observe photoelectric properties. Current density ($I_{sc}$), open-circuit voltage ($V_{oc}$), and fillfactor (ff) obtained as such were used to calculate solar conversion efficiency (η) by the following Mathematical formula 2. In this case, a xenon lamp (by Oriel) was used as a light source, and the solar condition (AM 1.5) of the xenon lamp was compensated using a standard solar cell.

$$\eta(\%) = (V_{oc} \times I_{sc} \times ff)/(P) \quad \text{Mathematical Formula 2}$$

In the above Mathematical Formula 2, "p" indicates 100 mW/cm² (1 sun).

The values measured in the above Test Examples 1 and 2 were all measured at room temperature and are shown in Table 1 below.

TABLE 1

| Category | | Ionic Conductivity (cm/Ω × cm²) | $I_{SC}$ | $V_{OC}$ | Fillfactor (ff) | η (%) |
|---|---|---|---|---|---|---|
| Embodiment 1 | Specimen 1 | 6.2 × 10E−4 | 9.78 | 0.569 | 0.498 | 2.77 |
| | Specimen 2 | 9.8 × 10E−4 | 10.52 | 0.565 | 0.498 | 2.96 |
| | Specimen 3 | 1.3 × 10E−3 | 11.10 | 0.570 | 0.490 | 3.10 |
| | Specimen 4 | 1.5 × 10E−3 | 10.82 | 0.481 | 0.472 | 2.45 |

TABLE 1-continued

| Category | | Ionic Conductivity (cm/Ω × cm$^2$) | $I_{SC}$ | $V_{OC}$ | Fillfactor (ff) | η (%) |
|---|---|---|---|---|---|---|
| Embodiment 2 | Specimen 1 | 4.9 × 10E−3 | 10.28 | 0.718 | 0.536 | 3.95 |
| | Specimen 2 | 5.2 × 10E−3 | 11.31 | 0.723 | 0.535 | 4.37 |
| | Specimen 3 | 5.8 × 10E−3 | 10.97 | 0.730 | 0.541 | 4.33 |
| | Specimen 4 | 6.4 × 10E−3 | 9.69 | 0.711 | 0.544 | 3.74 |
| Comparative Example 1 | Specimen 1 | 2.3 × 10E−9 | 7.66 | 0.326 | 0.272 | 0.67 |
| | Specimen 2 | 4.8 × 10E−9 | 7.92 | 0.323 | 0.315 | 0.80 |
| | Specimen 3 | 1.2 × 10E−8 | 8.23 | 0.390 | 0.314 | 1.00 |
| | Specimen 4 | 5.6 × 10E−9 | 8.11 | 0.341 | 0.366 | 1.01 |

As shown in Table 1 above, it can be seen that the polymer electrolytes of Embodiments 1 and 2 in accordance with the present disclosure show high ionic conductivity at room temperature, and the dye-sensitized solar cells comprising the coating layer made from the polymer electrolytes of Embodiments 1 and 2 in accordance with the present disclosure exhibit increased current density and voltage, and improved solar conversion efficiency, compared with the dye-sensitized solar cell of Comparative Example 1 comprising the coating layer made from the polymer electrolyte comprising polyethylene oxide which is a conventional polymer component.

What is claimed is:

1. A polymer electrolyte for a dye-sensitized solar cell comprising:
   a heat-curable epoxy resin,
   an imidazole-based curing accelerator, and
   a metal salt.

2. The polymer electrolyte for a dye-sensitized solar cell of claim 1, wherein the heat-curable epoxy resin has 2 to 8 functional groups, and the molecular weight of the heat-curable epoxy resin is 500 to 8,000.

3. The polymer electrolyte for a dye-sensitized solar cell of claim 1, wherein the polymer electrolyte comprises 0.1 to 20 parts by weight of the imidazole-based curing accelerator per 100 parts by weight of the heat-curable epoxy resin.

4. The polymer electrolyte for a dye-sensitized solar cell of claim 1, wherein the polymer electrolyte comprises 0.1 to 20 parts by weight of the metal salt per 100 parts by weight of the heat-curable epoxy resin.

5. The polymer electrolyte for a dye-sensitized solar cell of claim 1, wherein the polymer electrolyte for a dye-sensitized solar cell has a viscosity of 10 to 8,000 cps (centipoises).

6. The polymer electrolyte for a dye-sensitized solar cell of claim 5, wherein the polymer electrolyte for a dye-sensitized solar cell has a viscosity of 100 to 500 cps.

7. The polymer electrolyte for a dye-sensitized solar cell of claim 1, wherein the polymer electrolyte comprises 0.1 to 20 parts by weight the imidazole-based curing accelerator and 1 to 200 parts by weight of the metal salt per 100 parts by weight of the heat-curable epoxy resin.

8. The polymer electrolyte for a dye-sensitized solar cell of claim 1, wherein the imidazole-based curing accelerator is selected from the group consisting of 2-methylimidazole, 2-ethyl-4-methylimidazole, 2-benzyl-4-methylimidazole, 1-(2-cyanoethyl)-2-ethyl-4-methylimidazole, 1-cyanoethyl-2-methylimidazole and 1-(2-cyanoethyl)-2-phenyl-4,5-di-(cyanoethoxymethyl)imidazole.

9. The polymer electrolyte for a dye-sensitized solar cell of claim 1, wherein the metal salt is selected from the group consisting of LiI, NaI, KI, and BrI.

10. The polymer electrolyte for a dye-sensitized solar cell of claim 1, wherein the heat-curable epoxy resin has 2 to 8 functional groups, and the molecular weight of the heat-curable epoxy resin is 500 to 8,000,
    wherein the imidazole-based curing accelerator is selected from the group consisting of 2-methylimidazole, 2-ethyl-4-methylimidazole, 2-benzyl-4-methylimidazole, 1-(2-cyanoethyl)-2-ethyl-4-methylimidazole, 1-cyanoethyl-2-methylimidazole and 1-(2-cyanoethyl)-2-phenyl-4,5-di-(cyanoethoxymethyl)imidazole;
    wherein the metal salt is selected from the group consisting of LiI, NaI, KI, and BrI; and
    wherein the polymer electrolyte comprises 0.1 to 20 parts by weight the imidazole-based curing accelerator and 1 to 200 parts by weight of the metal salt per 100 parts by weight of the heat-curable epoxy resin.

11. A method for manufacturing a module of dye-sensitized solar cells using a polymer electrolyte of claim 1 for a dye-sensitized solar cell, comprising:
    applying the polymer electrolyte as an adhesive product between a working electrode and a counter electrode, wherein a final form of bonding is maintained in a solid phase.

12. The method for manufacturing a module of dye-sensitized solar cells using a polymer electrolyte for a dye-sensitized solar cell of claim 11, wherein the bonding between the electrodes is a hot melt bonding.

13. The method for manufacturing a module of dye-sensitized solar cells using a polymer electrolyte for a dye-sensitized solar cell of claim 11, wherein the bonding between the electrodes is a continuous roll coating or a continuous roll hot melt using a flexible substrate.

* * * * *